US012542386B2

(12) United States Patent
Meng et al.

(10) Patent No.: US 12,542,386 B2
(45) Date of Patent: Feb. 3, 2026

(54) PLUG CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Wei Meng, Kunshan (CN); Ming-Yue Sun, Kunshan (CN); Zheng-Rong Zhu, Kunshan (CN); Jun Chen, Kunshan (CN); Yang-Tsun Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 297 days.

(21) Appl. No.: 18/211,438

(22) Filed: Jun. 19, 2023

(65) Prior Publication Data

US 2023/0420875 A1 Dec. 28, 2023

(30) Foreign Application Priority Data

Jun. 23, 2022 (CN) ......................... 202221594872.1

(51) Int. Cl.

| | |
|---|---|
| ***H01R 12/71*** | (2011.01) |
| ***H01R 13/516*** | (2006.01) |
| ***H01R 13/627*** | (2006.01) |
| ***H01R 13/639*** | (2006.01) |
| *H01R 13/633* | (2006.01) |

(52) U.S. Cl.
CPC ......... *H01R 12/716* (2013.01); *H01R 13/516* (2013.01); *H01R 13/6272* (2013.01); *H01R 13/639* (2013.01); *H01R 13/6335* (2013.01)

(58) Field of Classification Search
CPC ................ H01R 12/716; H01R 13/516; H01R 13/6272; H01R 13/639; H01R 13/6335; H01R 12/72; H01R 12/75; H01R 13/6275
See application file for complete search history.

(56) References Cited

U.S. PATENT DOCUMENTS 10,270,191 B1 * 4/2019 Li ........................ H01R 12/771
10,601,181 B2 * 3/2020 Lu .......................... H01R 12/79
(Continued)

FOREIGN PATENT DOCUMENTS

| | | |
|---|---|---|
| CN | 209045871 | 6/2019 |
| CN | 212626230 | 2/2021 |
| CN | 213845580 | 7/2021 |

*Primary Examiner* — Abdullah A Riyami
*Assistant Examiner* — Nelson R. Burgos-Guntin
(74) *Attorney, Agent, or Firm* — Ming Chieh Chang

(57) ABSTRACT

A plug connector for mating with a receptacle connector in a mating direction, includes: an insulative housing; a connecting member accommodated in the insulative housing, the connecting member having a mating portion to be mated with the receptacle connector; and a cable connected to the connecting member, wherein the insulative housing includes a first housing and a second housing integrally formed on the first housing, and the second housing is further integrally formed at a junction between the connecting member and the cable so as to fix the first housing, the cable, and the connecting member together as a whole.

6 Claims, 7 Drawing Sheets

(56) References Cited

U.S. PATENT DOCUMENTS

| | | | | |
|---|---|---|---|---|
| 10,741,970 | B1 * | 8/2020 | Liu | H01R 13/665 |
| 10,886,649 | B1 * | 1/2021 | Yang | H01R 12/716 |
| 11,189,971 | B2 * | 11/2021 | Lu | H01R 12/75 |
| 2018/0205177 | A1 * | 7/2018 | Zhou | H01R 13/6594 |
| 2021/0075159 | A1 * | 3/2021 | Wang | H01R 13/6582 |
| 2022/0115799 | A1 * | 4/2022 | Tanaka | H01R 12/79 |

* cited by examiner

PLUG CONNECTOR

BACKGROUND OF THE INVENTION

Field of the Invention

The present invention relates generally to a plug connector, and particularly to a plug connector with stable structure.

Description of Related Arts

China Patent No. CN209045871U discloses a plug connector comprising an insulative housing assembled from a front housing and a rear housing, a circuit board accommodated in the insulative housing, a cable soldered on the circuit board, and an inner mold formed at the connection between the circuit board and the cable to protect the solder joints. The connector has an inner mold, and the front shell and the rear shell are assembled with each other, which increases the overall size of the plug connector, and increases the manufacturing process and manufacturing cost, moreover, in the process of use, the structure between the front shell, the rear shell, and the inner mold is not stable enough, and there is a possibility of mutual movement.

An improved plug connector is desired.

SUMMARY OF THE INVENTION

The objective of the present invention is to provide a plug connector with stable structure and fewer manufacturing steps.

To achieve the above object, a plug connector for mating with a receptacle connector in a mating direction comprises: an insulative housing; a connecting member accommodated in the insulative housing, the connecting member having a mating portion to be mated with the receptacle connector; and a cable connected to the connecting member, wherein the insulative housing includes a first housing and a second housing integrally formed on the first housing, and the second housing is further integrally formed at a junction between the connecting member and the cable so as to fix the first housing, the cable, and the connecting member together as a whole.

Compared to prior art, in the plug connector of the present invention, the first housing, the cable, and the connecting member are fixed as a whole through the integrally formed second housing, so that the structure of the plug connector is more stable, the overall size of the plug connector is reduced, and the manufacturing process and manufacturing cost are reduced.

DETAILED DESCRIPTION OF THE PREFERRED EMBODIMENT

Figure 1:
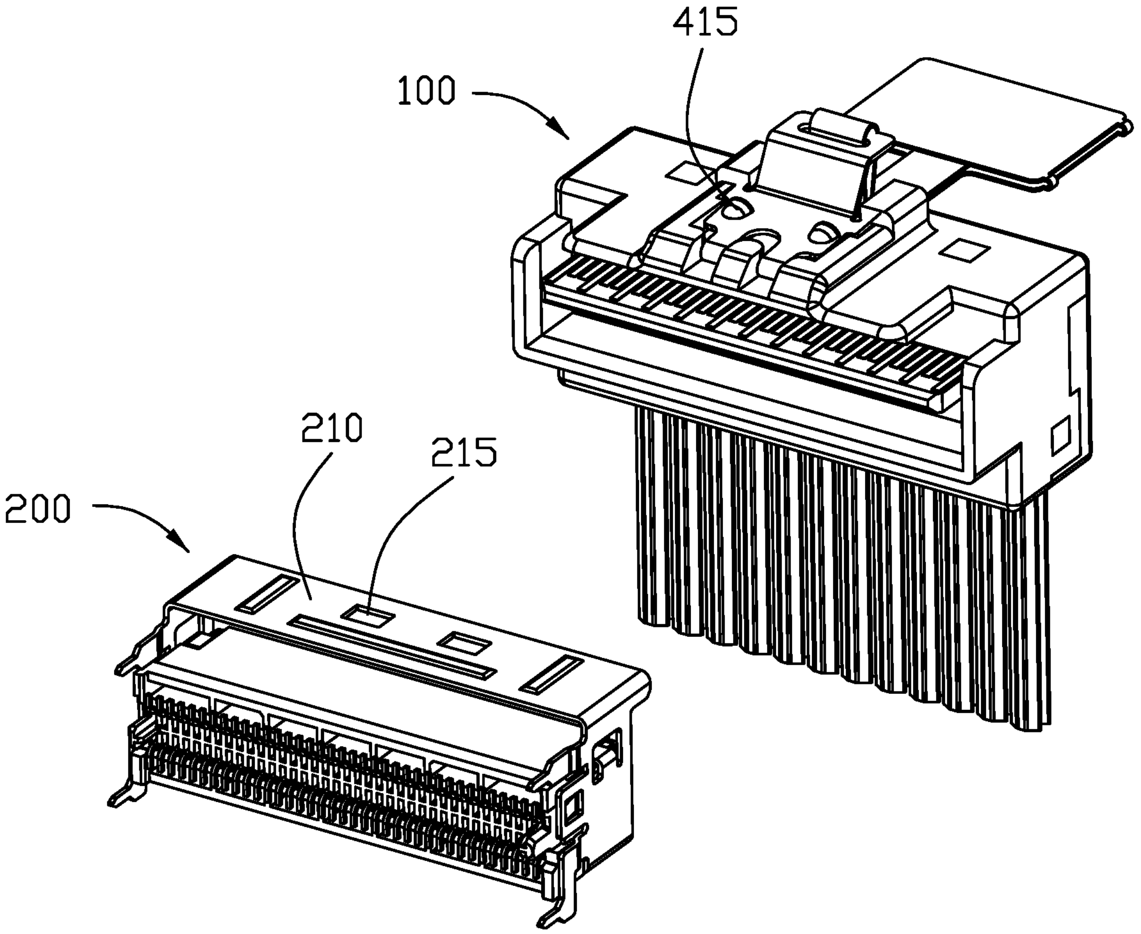
FIG. 1 is a perspective view of a plug connector in accordance with the present invention before mating with a mating receptacle connector.
Figure 2:
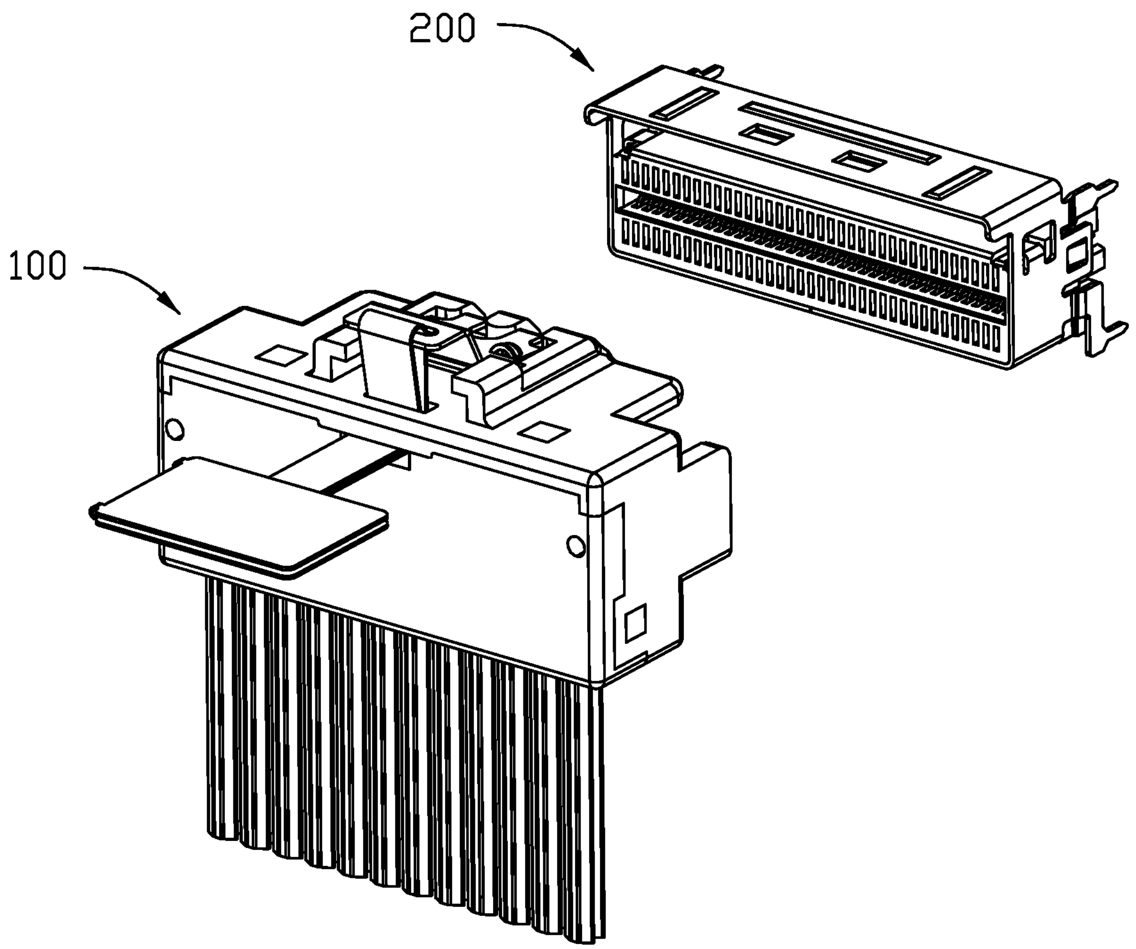
FIG. 2 is another perspective view of the plug connector before mating with the mating receptacle connector as shown in FIG. 1.
Figure 3:
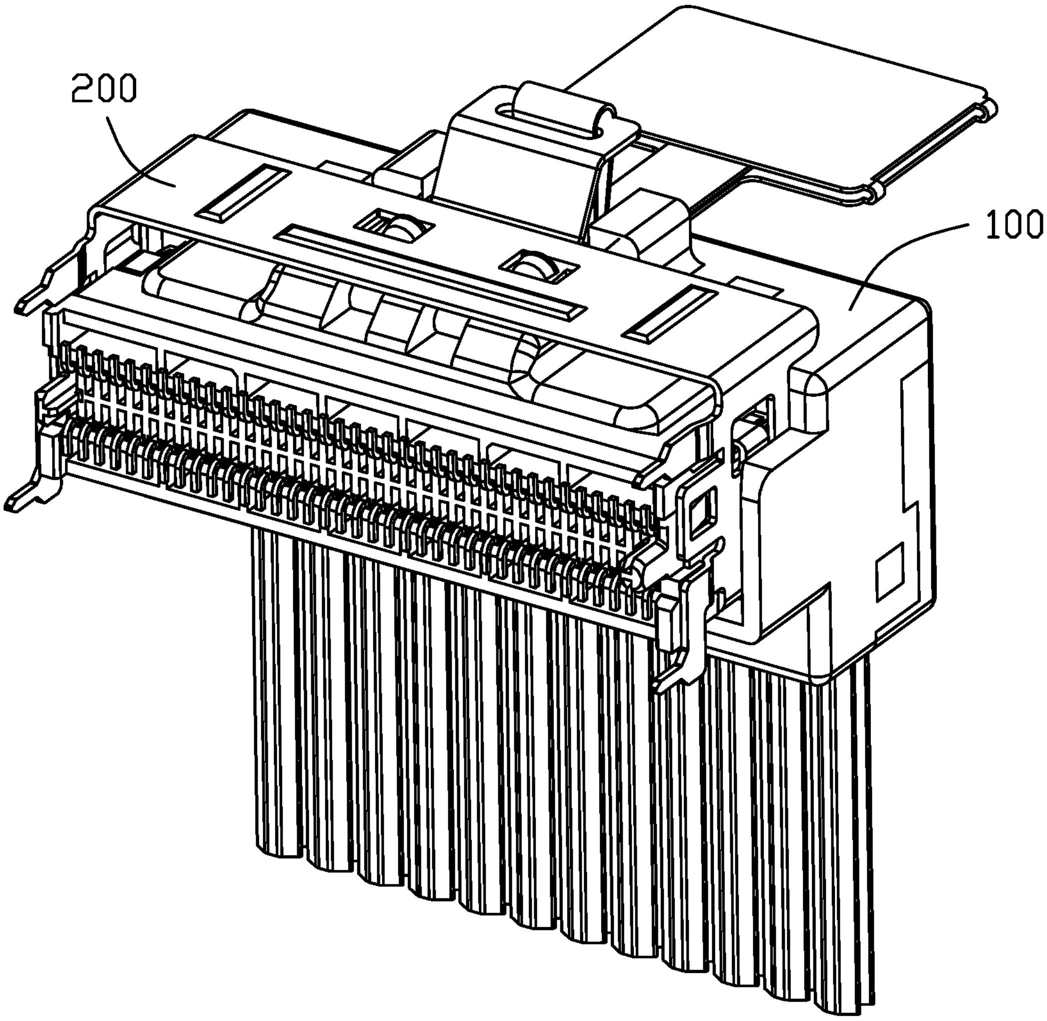
FIG. 3 is a perspective view of the plug connector after mating with the mating receptacle connector as shown in FIG. 1.
Figure 4:
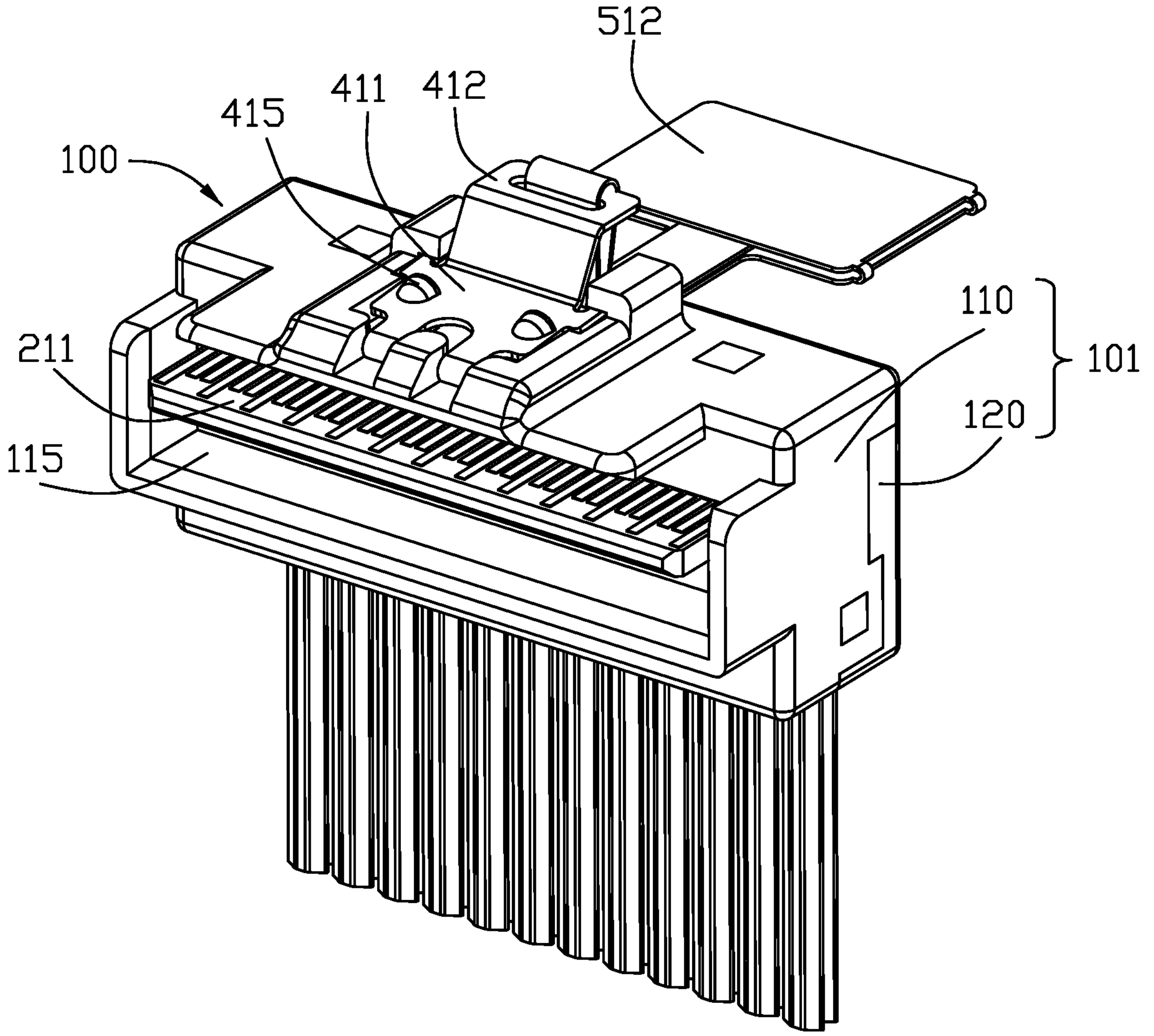
FIG. 4 is perspective view of the plug connector in FIG. 2.
Figure 5:
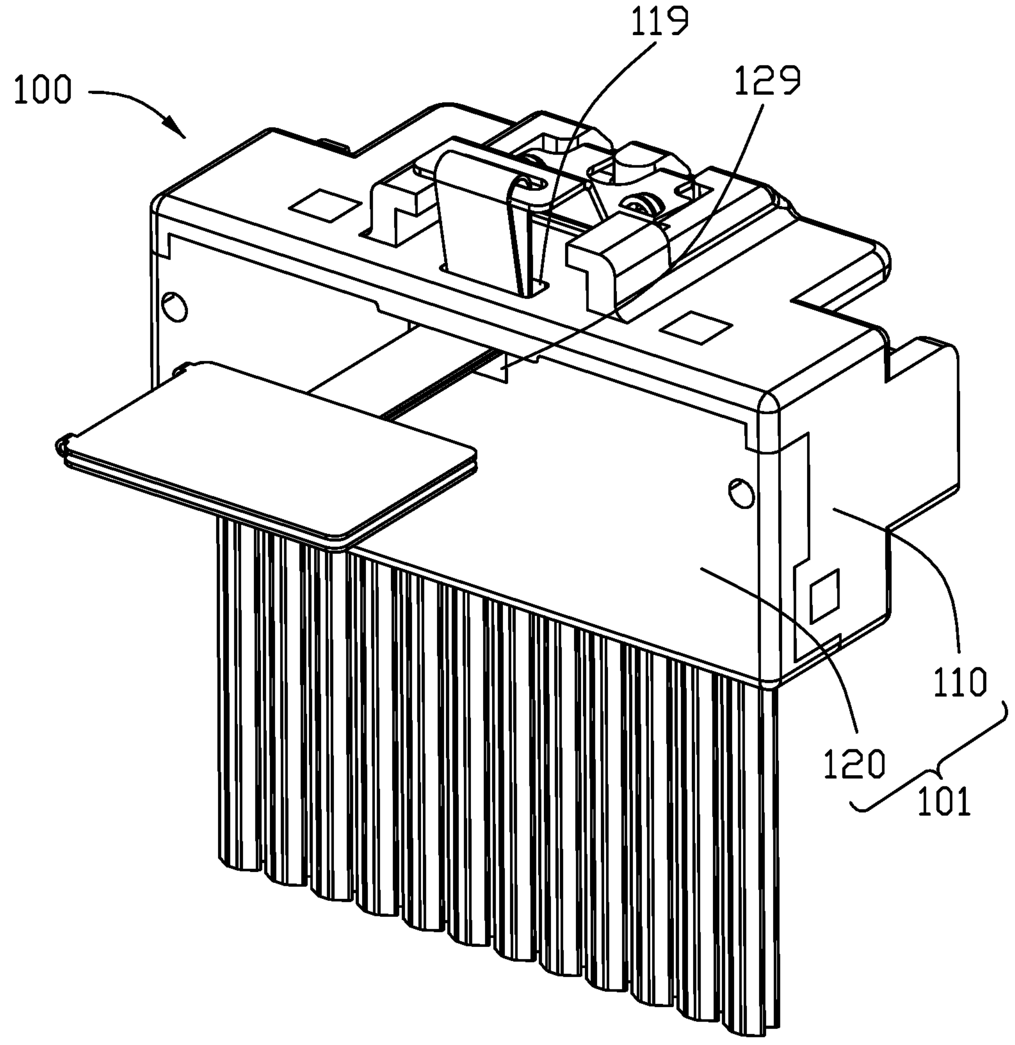
FIG. 5 is another perspective view of the plug connector in FIG. 3.
Figure 6:
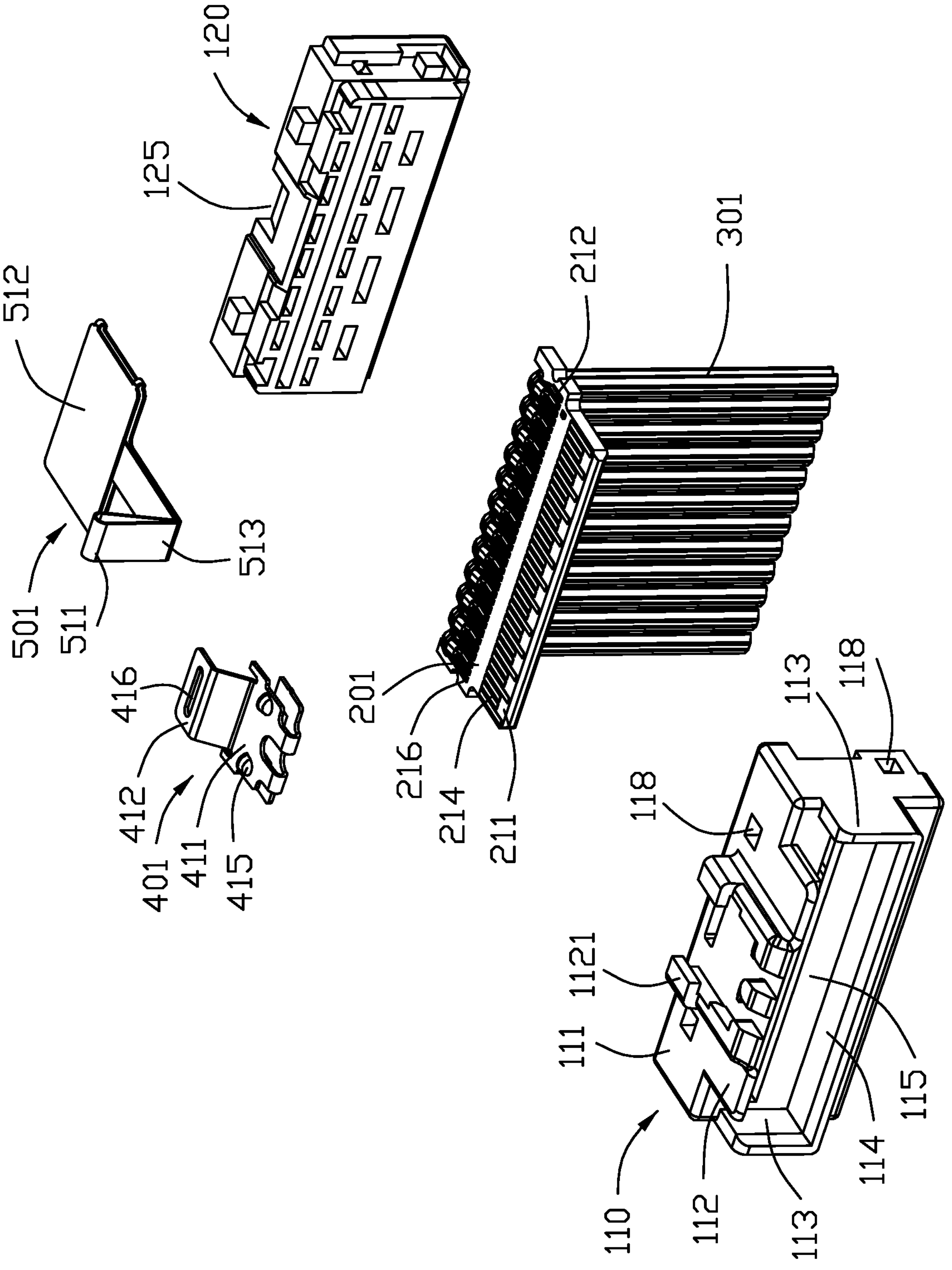
FIG. 6 is an exploded perspective view of the plug connector in FIG. 3.
Figure 7:
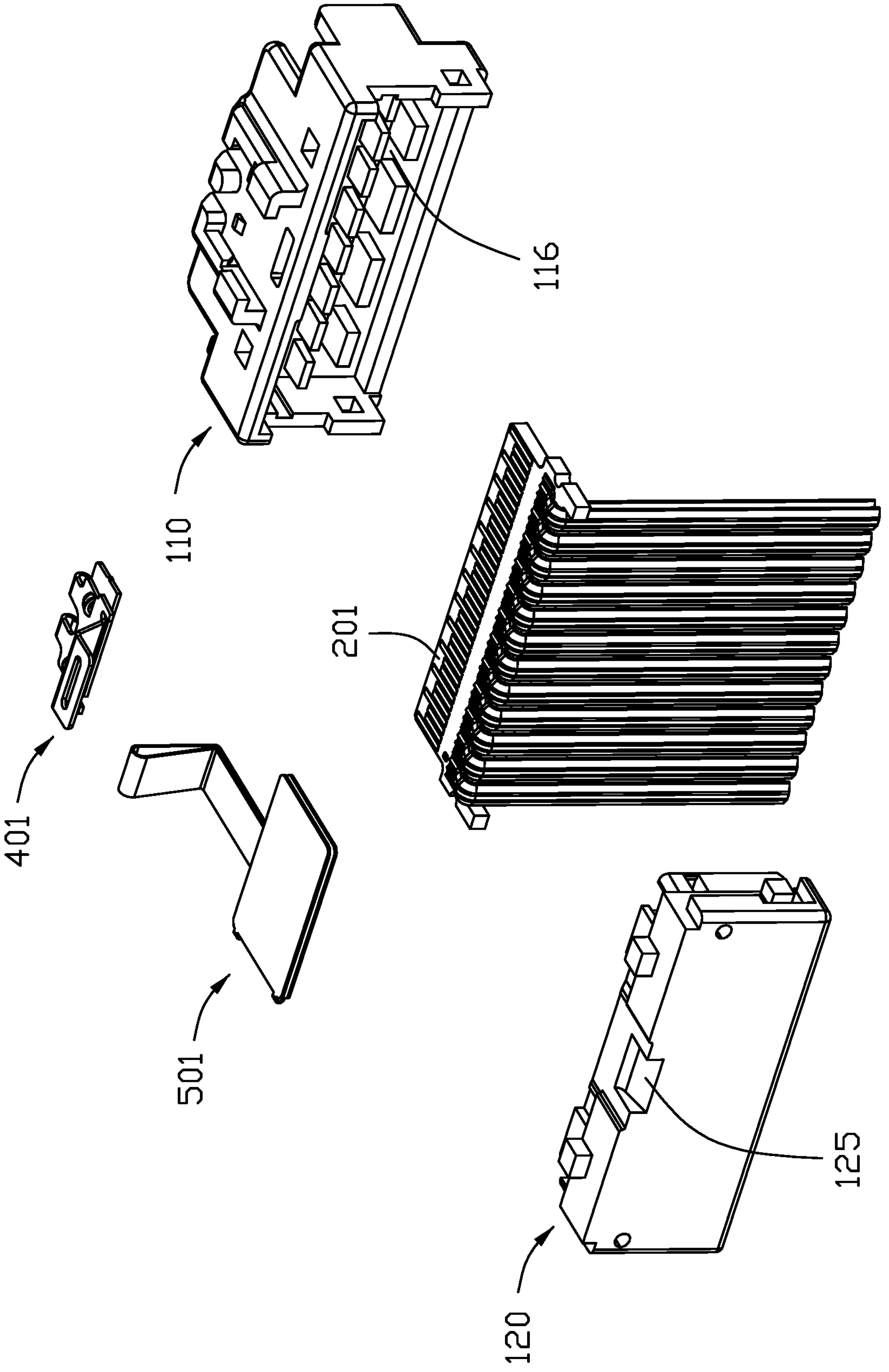
FIG. 7 is another exploded perspective view of the plug connector in FIG. 5.

Referring to FIGS. 1-7, a plug connector 100 in accordance with the present invention is shown. The plug connector 100 can be snap-fitted with a mating receptacle connector 200 along the front-rear direction. The plug connector 100 comprises an insulative housing 101, a connecting member accommodated in the insulative housing 101, a cable 301 electrically connected to the connecting member, a locking elastic member 401 installed on the insulating housing 101, and a drawstring 501 connected to the locking elastic member 401. The locking elastic member 401 can be snap-fitted with the metal shell 210 of the receptacle connector 200.

The connecting member can be metal conductive terminals or a circuit board. Specifically, in this embodiment, the connecting member is a circuit board 201, and the circuit board 201 comprises a mating portion 211 mated with the receptacle connector 200 and a connecting portion 212 connected with the cable 301. The insulating housing 101 includes a first housing 110 and a second housing 120. The second housing 120 is integrally molded on the first housing 110, and is integrally molded at the junction of the circuit board 201 and the cable 301, so as to fix the first housing 110, the cable 301, and the circuit board 201 as a whole.

The first housing 110 includes a main body 111, a mating portion 112 protruding forward from the main body 111, a pair of side baffles 113 on the left and right sides of the main body 111, and a lower baffle 114 on the lower side of the main body 111. The pair of side baffles 113 and the lower baffle 114 forms a U-shape. When the plug connector 100 is mated with the receptacle connector 200, each of the baffles is located outside the metal shell 210 of the receptacle connector 200. The upper part of the mating portion 112 has a boss 1121 for fixing the locking elastic member 401.

The first housing 110 further comprises a front opening 115 and a through hole 116 passing through the front opening 115 along the front-rear direction for the circuit board 201 to be installed in the first housing 110. The second housing 120 is integrally formed on the rear area of the first housing 110. The rear part of the first housing 110 is has openings 118. The second housing 120 is integrally formed on the first housing 110 during molding, and enters into the opening 118 to form a stable connection with the first housing 110.

The insulating housing 101 has a first drawstring hole 119 extending in the up-down direction and a second drawstring hole 129 extending in the front-rear direction. The first drawstring hole 119 penetrates the upper surface of the insulating housing 101. The second drawstring hole 129 penetrates the rear surface of the insulating drawstring 101. The first drawstring hole 119 communicates with the second drawstring hole 129. Specifically, in this embodiment, the first drawstring hole 119 is on the first housing 110. The second housing 120 forms a groove 125 penetrating through its rear surface during molding. The second drawstring hole 129 is jointly surrounded by the groove 125 and the first housing 110.

The circuit board 201 is placed horizontally, and inserted into the first housing 110 from the rear to the front through the through hole 116, and the mating portion 211 of the circuit board 201 is exposed in the front opening 115. The upper and lower surfaces of the mating portion 211 have a plurality of metal pads 214 that can be matched with the conductive terminals of the receptacle connector 200. The rear portion of the circuit board 201 includes a plurality of solder pads 216 on the upper and lower surfaces. The front ends of the cables 301 are respectively soldered to the solder pads 216 of the circuit board 201. The rear end of the cable 301 extends downwards out of the first housing 110 and the second housing 120. The direction in which the cable 301 extends out of the insulating housing 101 is perpendicular to the surface where the circuit board 201 is located. The second housing 120 is integrally formed to cover the solder joints of the circuit board 201 and the cable 301, which can not only protect the solder joints of the circuit board 201 and the cable 301, but also save costs.

The locking elastic member 401 includes an elastic sheet 411 fixed on the boss 1121, and a connecting sheet 412 connected at the rear end of the elastic sheet 411. The elastic sheet 411 has a locking protrusion 415 for locking with the locking hole 215 of the receptacle connector 200. The elastic sheet 411 can drive the locking protrusion 415 to elastically swing up and down. The connecting sheet 412 has an opening 416 for the drawstring 501 to pass through. The drawstring 501 passes through the opening 416 to form a closed loop to connect with the locking elastic member 401.

The drawstring 501 includes a connecting portion 511 connected to the connecting sheet 412, a handle portion 512 for the users to pull by hand, and a perforated portion 513 between the connecting portion 511 and the handle portion 512. The perforated portion 513 passes through the first drawstring hole 119 and the second drawstring hole 129. The drawstring extends along the up and down direction between the connecting portion 511 and the perforated portion 513. When the plug connector 100 is pulled out from the receptacle connector 200, pull the handle portion 512 backward horizontally to drive the connecting sheet 412 to move downward to drives the locking protrusion 415 on the elastic sheet 411 to move downward withdraw from the locking hole 215 of the receptacle connector 200. The latch between the plug connector 100 and the receptacle connector 200 is released. When the external force is removed, the locking protrusion 415 returns to its original position under the action of its own elastic restoring force. In the plug connector 100 of the present invention, the direction of pulling the drawstring 501 is horizontal and backward, which meets the requirements for use in a narrow space and is convenient for users to pull out.

In the plug connector 100 of the present invention, the second housing 120 is integrally formed on the first housing 110, and is integrally formed at the junction between the connecting member and the cable 301, so as to fix the first housing 110, the cable 301, and the connecting member as a whole, making the structure of the plug connector 100 more stable, reducing the overall size of the plug connector 100, and reducing the manufacturing process and manufacturing cost.

The invention claimed is:

1. A plug connector for mating with a receptacle connector in a mating direction, comprising:

an insulative housing;

a connecting member accommodated in the insulative housing, the connecting member having a mating portion to be mated with the receptacle connector;

a cable connected to the connecting member;

a locking elastic member assembled on the insulative housing, the locking elastic member having a locking protrusion for matching with a locking hole of the receptacle connector; and a drawstring connected with the locking elastic member; wherein the insulative housing includes a first housing and a second housing integrally formed on the first housing, and the second housing is separately molded at a junction between the connecting member and the cable so as to fix the first housing, the cable, and the connecting member together as a whole; and the first housing has a through hole through which the connecting member is installed therein, and the second housing is integrally formed in a rear part of the first housing.

2. The plug connector as claimed in claim 1, wherein the connecting member comprises metal conductive terminals.

3. The plug connector as claimed in claim 1, wherein the connecting member comprises a circuit board, and the cable extends out of the insulating housing in a direction perpendicular to the circuit board.

4. The plug connector as claimed in claim 1, wherein the rear part of the first housing has openings, and the second housing is filled into the first housing and further enters into the openings to form a stable connection therebetween.

5. The plug connector as claimed in claim 1, wherein:

the insulating housing has a first drawstring hole extending up and down and a second drawstring hole extending forward and backward, the first drawstring hole penetrates an upper surface of the insulating housing, the second drawstring hole penetrates a rear surface of the insulating housing, and the first drawstring hole communicates with the second drawstring hole;

the first drawstring hole is on the first housing, the second housing forms a groove, and the second drawstring hole is jointly surrounded by the first housing and the groove of the second housing;

the drawstring includes a connection portion connected with an elastic sheet, a handle portion, and a perforated portion therebetween; and the perforated portion passes through the first drawstring hole and the second drawstring hole.

6. The plug connector as claimed in claim 5, wherein the drawstring extends along the up and down direction between the connecting portion and the perforated portion.

* * * * *